(12) United States Patent
Mihailovici et al.

(10) Patent No.: US 10,469,400 B2
(45) Date of Patent: *Nov. 5, 2019

(54) METHOD AND APPARATUS FOR PROVISIONING OF RESOURCES TO SUPPORT APPLICATIONS AND THEIR VARYING DEMANDS

(71) Applicant: AVAGO TECHNOLOGIES INTERNATIONAL SALES PTE. LIMITED, Singapore (SG)

(72) Inventors: Virgil Nicolae Mihailovici, San Jose, CA (US); Muralidharan Rangarajan, Santa Clara, CA (US)

(73) Assignee: AVAGO TECHNOLOGIES INTERNATIONAL BUSINESS SALES PTE. LIMITED, Singapore (SG)

(*) Notice: Subject to any disclaimer, the term of this patent is extended or adjusted under 35 U.S.C. 154(b) by 48 days.

This patent is subject to a terminal disclaimer.

(21) Appl. No.: 15/640,408

(22) Filed: Jun. 30, 2017

(65) Prior Publication Data

US 2017/0302588 A1    Oct. 19, 2017

Related U.S. Application Data

(63) Continuation of application No. 12/909,131, filed on Oct. 21, 2010, now Pat. No. 9,729,464.

(Continued)

(51) Int. Cl.
*H04L 12/911* (2013.01)
*G06F 9/455* (2018.01)
(Continued)

(52) U.S. Cl.
CPC .......... *H04L 47/70* (2013.01); *G06F 9/45558* (2013.01); *G06F 9/5077* (2013.01);
(Continued)

(58) Field of Classification Search
CPC ...... H04L 47/70; G06F 9/45558; G06F 11/30; G06F 9/5077; G06F 8/60; G06F 2009/45562; G06F 2209/508
See application file for complete search history.

(56) References Cited

U.S. PATENT DOCUMENTS

2005/0149940 A1    7/2005  Calinescu et al.
2006/0107087 A1    5/2006  Sieroka et al.
(Continued)

OTHER PUBLICATIONS

Non-Final Rejection, dated Nov. 19, 2012, for U.S. Appl. No. 12/909,131, filed Oct. 21, 2010, 16 pages.
(Continued)

*Primary Examiner* — June Y Sison
*Assistant Examiner* — Steven C Nguyen
(74) *Attorney, Agent, or Firm* — Xsensus LLP

(57) ABSTRACT

Embodiments of the present invention provide a method for allowing efficient allocation of data center resources in a virtualized data center. In one step, network information is obtained from a network using an application resource broker (ARB). In another step, data center information is obtained from a virtual center server using the ARB. In another step, a set of application traffic metrics and a set of virtualized infrastructure metrics are determined using the ARB based on the obtained network information and data center information respectively. The ARB is implemented on a computer system.

20 Claims, 10 Drawing Sheets

Related U.S. Application Data

(60) Provisional application No. 61/357,692, filed on Jun. 23, 2010.

(51) Int. Cl.
| | | |
|---|---|---|
| *G06F 11/30* | (2006.01) | |
| *G06F 9/50* | (2006.01) | |
| *G06F 8/60* | (2018.01) | |

(52) U.S. Cl.
CPC ............... *G06F 11/30* (2013.01); *G06F 8/60* (2013.01); *G06F 2009/45562* (2013.01); *G06F 2209/508* (2013.01)

(56) References Cited

U.S. PATENT DOCUMENTS

| | | | |
|---|---|---|---|
| 2006/0245411 A1* | 11/2006 | Chen | G06F 11/008 370/350 |
| 2008/0034365 A1 | 2/2008 | Dahlstedt et al. | |
| 2009/0024994 A1 | 1/2009 | Kannan et al. | |
| 2009/0119673 A1 | 5/2009 | Bubba | |
| 2010/0125844 A1* | 5/2010 | Mousseau | G06F 9/50 718/1 |
| 2010/0211669 A1* | 8/2010 | Dalgas | G06F 9/5027 709/224 |
| 2010/0223378 A1 | 9/2010 | Wei | |
| 2011/0012902 A1 | 1/2011 | Rajagopalan et al. | |
| 2011/0035494 A1* | 2/2011 | Pandey | G06F 9/5077 709/224 |
| 2011/0154324 A1 | 6/2011 | Pagan et al. | |
| 2011/0209146 A1 | 8/2011 | Box et al. | |
| 2011/0209147 A1 | 8/2011 | Box et al. | |
| 2011/0231568 A1 | 9/2011 | Bansal et al. | |
| 2011/0292792 A1 | 12/2011 | Zuo et al. | |
| 2011/0296024 A1 | 12/2011 | Madani et al. | |
| 2011/0301998 A1 | 12/2011 | Talwar et al. | |
| 2012/0089980 A1 | 4/2012 | Sharp et al. | |
| 2015/0106813 A1 | 4/2015 | Mihailovici et al. | |

OTHER PUBLICATIONS

Final Rejection, dated Jul. 9, 2013, for U.S. Appl. No. 12/909,131, filed Oct. 21, 2010,16 pages.

Non-Final Rejection, dated Jul. 31, 2014, for U.S. Appl. No. 12/909,131, filed Oct. 21, 2010,14 pages.

Final Rejection, dated Mar. 20, 2015, for U.S. Appl. No. 12/909,131, filed Oct. 21, 2010,18 pages.

Non-Final Rejection, dated Dec. 11, 2015, for U.S. Appl. No. 12/909,131, filed Oct. 21, 2010, 16 pages.

Final Rejection, dated Jul. 28, 2016, for U.S. Appl. No. 12/909,131, filed Oct. 21, 2010,20 pages.

Non-Final Rejection, dated Feb. 14, 2017, for U.S. Appl. No. 14/574,916, filed Dec. 18, 2014, 17 pages.

Notice of Allowance, dated May 5, 2017, for U.S. Appl. No. 12/909,131, filed Oct. 21, 2010, 16 pages.

\* cited by examiner

METHOD AND APPARATUS FOR PROVISIONING OF RESOURCES TO SUPPORT APPLICATIONS AND THEIR VARYING DEMANDS

CROSS-REFERENCES TO RELATED APPLICATIONS

This application is a continuation of U.S. patent application Ser. No. 12/909,131, filed on Oct. 21, 2010, which claims priority to U.S. Provisional Application No. 61/357,692, filed on Jun. 23, 2010, which is incorporated by reference herein in its entirety.

FIELD

This invention relates to data center virtualization generally, and more specifically to monitoring and provisioning application resources in a virtualized data center.

BACKGROUND

Data centers are the sin qua non of the information age society. If the data center of a modern company is interrupted, that company will cease to function. The service a data center provides has become just as essential as any other utility. In keeping with their importance, data centers generally operate under service level agreements (SLAs) which mandate that the data center provide a certain level of end user experience at all times. It is the job of a data center administrator to assure that all of the SLAs are honored. This is not an easy task. Data center resources are costly. Large data centers operate at power densities that are more than 100 times greater than for a typical office building, and it is estimated that by 2012 the cost of power for a data center will exceed the cost of the original capital investment. In addition, the demand placed on a data center fluctuates dramatically with time so provisioning for peak demand is highly inefficient. Efficiently provisioning data center resources to end users is a critical exercise in resource allocation that requires continuous innovation to meet a growing demand.

In the face of the challenges described above, nearly all modern data centers are virtualized. The term "virtualization" is used with reference to technologies that are designed to provide a layer of abstraction between a computer hardware system and the software the hardware system is running. Virtualization allows a single operating system to run on a large single pool of computing resources comprised of a group of servers, and likewise allows multiple operating systems to run on a single machine. As such, a virtualized data center provides a much greater degree of flexibility in terms of how it responds to changing demands through the use of techniques such as clustering and partitioning.

The difference between a static and virtualized data center can be described with reference to FIG. 1. In FIG. 1, legacy data center 110 receives service requests from network 111 through inbound traffic link 112. Service requests are taken in by application delivery controller (ADC) 113. ADC 113 then forwards the request to one or more of the servers 114, 115, and 116. The servers are visible on the network as separate physical devices. In contrast, in virtualized data center 120 the servers are not physically visible to network 121 through inbound traffic link 122. Instead, the ADC 123 presents the servers as a load balanced pool 124 of many virtual machines (VMs) 125. Consider three applications where each requires two thirds the processing power of any of the servers 114, 115, or 116. In the traditional data center, all three servers would be required. In the virtualized data center, only two servers would be required for the same applications because three virtual machines could be run on two of the servers.

The decoupling of the hardware and software through a layer of abstraction brought about by virtualization allows for server consolidation. Therefore, virtualization results in a significant decrease in the number of servers that an enterprise must maintain and a commensurate increase in the resources an administrator can provision given a specific energy and cost constraint. Data center resource benefits are compounded by the fact that a more optimal utilization of resources decreases the amount of power servers consume while at the same time decreasing the amount of heat that must be removed by cooling systems with their own burdensome power requirements. Data center virtualization generally provides more storage, more processing resources, and higher overall utilization of those resources at a set cost.

The benefits of virtualization are somewhat mitigated by the increased complexity that the dynamism of virtualization creates. Virtualization reduces the physical requirements of the data center, but it also compounds the level of management complexity of the servers. It is much more difficult for a data center administrator to track exactly what hardware is being used to satisfy the applications the center is running. Although a careful administrator can handle the added dynamism of the virtualized data center, the administrator's time is a resource that is just as precious as the power the hardware consumes. Virtualization may decrease the number of servers that a data center must run, but it also results in the data center having an increased level of operational overhead.

Current solutions for monitoring, managing, and optimizing the allocation of virtualized resources include tools for gathering statistics and applying dynamic policies to better allocate physical resources among applications. However, the current solutions are front server or front device centric. They provide insights from the front end engine such as an ADC, but they do not provide visibility and insight into the lower proprietary tiers of the virtual server environment. They also lack the capability to obtain application by application statistics and information regarding grouping of real and virtual servers.

BRIEF SUMMARY

In one embodiment of the invention, an apparatus for assisting the provisioning of application resources in a virtualized application data center is provided. The apparatus comprises a central controller. The apparatus also comprises a data center communication port configured to receive data center information and provide this data center information to the central controller. The apparatus also comprises a network communication port configured to receive network information and provide this network information to the central controller. The central controller is configured to prepare a set of application traffic metrics for a first external use based on the network information, and a set of virtualized infrastructure metrics for a second external use based on the data center information.

In another embodiment of the invention, a method for allowing efficient allocation of data center resources in a virtualized data center is provided. In one step, network information is obtained from a network using an application resource broker. In another step, data center information is obtained from a virtual center server using the application resource broker. In another step, a set of application traffic metrics are determined based on the network information, and a set of virtualized infrastructure metrics are determined based on the data center information using the application resource broker. In another step, the set of application traffic metrics and the set of virtualized infrastructure metrics are provided to an external user. The application resource broker is implemented on a computer system.

In another embodiment of the invention, an article of manufacture capable of performing a method for monitoring the performance of a virtualized data center is provided. The article of manufacture comprises one or more processor readable storage devices having processor readable non-transitory code embodied on the processor readable storage devices. The processor readable non-transitory code is for programming one or more processors to perform a method for allowing efficient allocation of data center resources in a virtualized data center. The method comprises several steps. In one step, network information is obtained from a network using an application resource broker. In another step, data center information is obtained from a virtual center server using the application resource broker. In another step, a set of application traffic metrics are determined based on the network information, and a set of virtualized infrastructure metrics are determined based on the data center information using the application resource broker. In another step, the set of application traffic metrics and the set of virtualized infrastructure metrics are provided to an external user. The application resource broker is implemented on a computer system.

DETAILED DESCRIPTION

Figure 1:
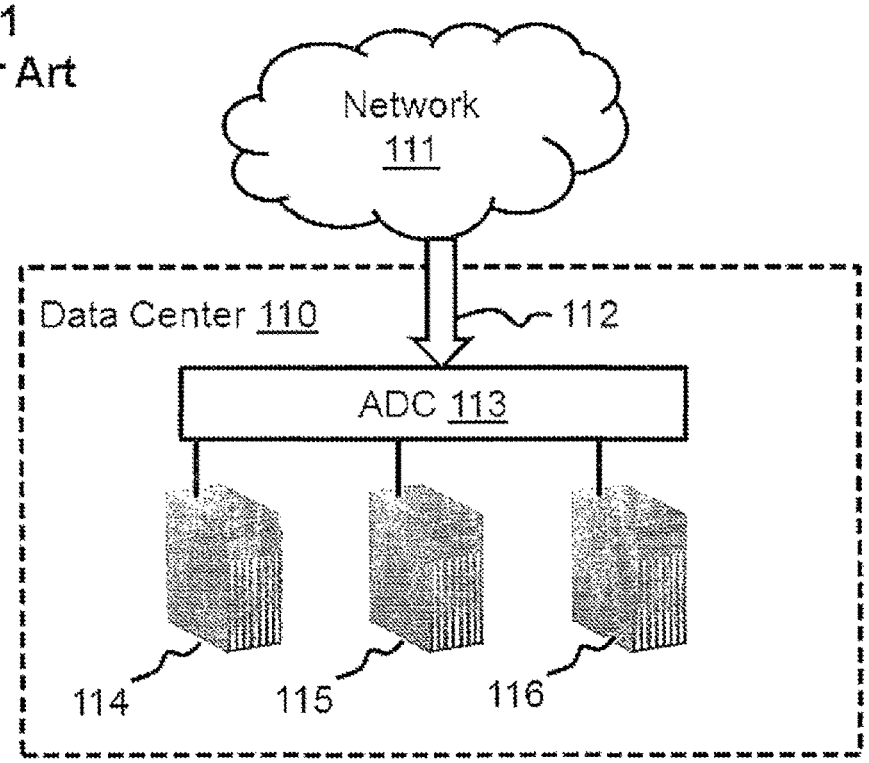
FIG. 1 illustrates a block diagram of a static data center and a virtualized data center that are in accordance with the prior art.
Figure 1:
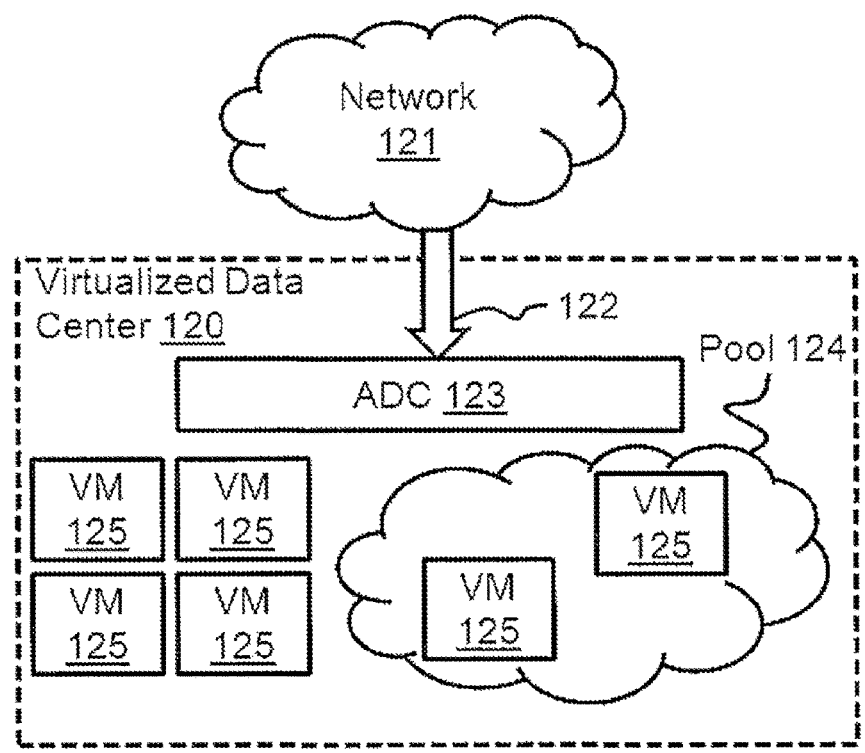

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be include within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

The continuously increasing demands placed on data center resources have created a need for a system capable of rapidly responding to changing demand and tracking real time application behavior and end user experience quality. The complexity introduced by virtualization has created a need for increasing the visibility of the connection between the end user applications and the virtual machines that comprise the data center's active resources. A data center administrator needs to be able to determine what virtual machines are associated with which applications and determine what real resources are actually in use implementing a virtual machine. A system capable of providing these benefits would beneficially be able to do so with reduced operational overhead. Pursuant to this objective, the system should provide a network administrator with a carefully selected suite of information and should also have the ability to provision resources to applications automatically without the need for administrator interaction.

Embodiments of the present invention overcome the deficiencies of current monitoring tools applied to data center virtualization. Specific embodiments of the invention provide for holistic network-wide performance monitoring of key metrics. In specific embodiments of the invention, the aforementioned performance monitoring includes the provisioning of application-centric all-tier visibility to autonomously associate which virtual machines are supporting a specific application. In specific embodiments of the invention, the aforementioned key metrics include application traffic metrics such as response times and virtualized infrastructure metrics such as processing unit utilization percentages. Specific embodiments of the invention provide for automated resource provisioning based on the aforementioned key metrics. Specific embodiments of the invention base the aforementioned automation on historical trends in the aforementioned key metrics.

Figure 2:
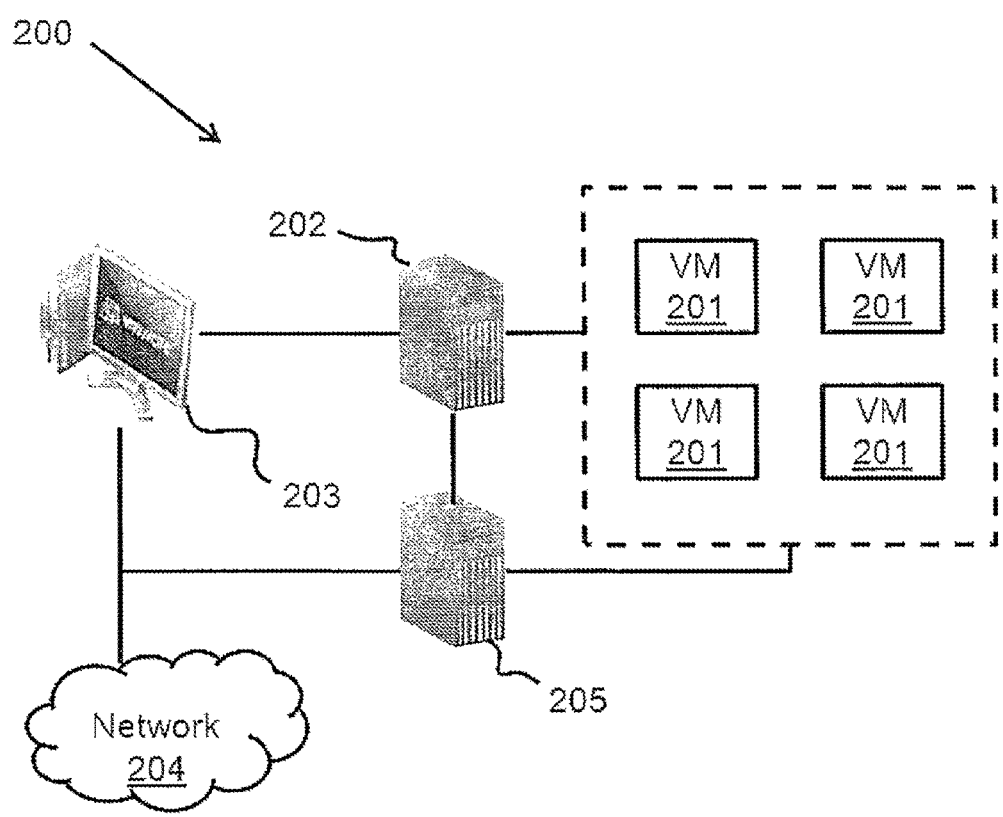
FIG. 2 illustrates a block diagram of a virtualization environment that is in accordance with the present invention.

A specific embodiment of the invention can be described with reference to FIG. 2. FIG. 2 displays virtualization environment 200. Virtualization environment 200 contains VMs 201, virtual center server 202, and virtual interface client 203. Virtual center server 202 comprises the registration of the URL pointing to the configuration file of VMs 201. Virtual interface client 203 is capable of pulling in pages from any web server on network 204 as well as retrieving the configuration URL from virtual center server 202. Network 204 could be the Internet or any intranet. Web server 205 allows a third party to build a web service hosted on a standalone or pre-existing web container. Web server 205 can be a separate machine or it can run on the same machine as the virtual center server 202. Web server 205 has logical connections to virtual center server 202 as well as VMs 201. Web server 205 can be used to implement an application resource broker (ARB). The ARB has visibility at the front end of the data center through its connection to VMs 201 and also has visibility to the deep tiers of the data center environment through its connection to virtual center server 202. The information available to the ARB is available to virtual interface client 203. Web server 205 is capable of implementing both the ARB function and the data center workload manager function for the data center at various tiers of the data center hierarchy.

Figure 3:
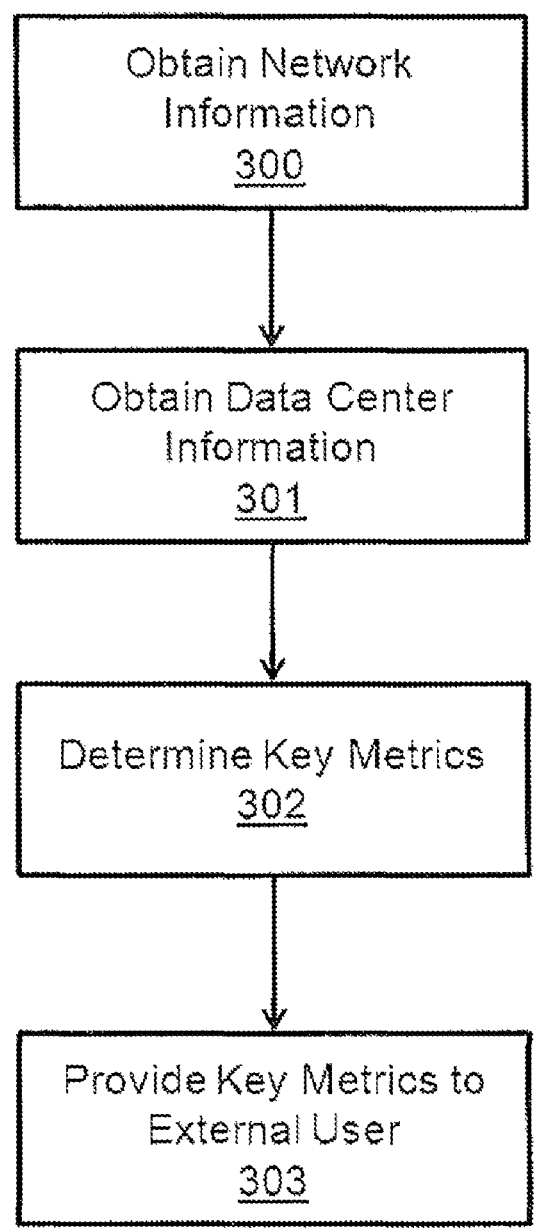
FIG. 3 illustrates a process flow chart of a method for allowing efficient allocation of data center resources in a virtualized data center that is in accordance with the present invention.

A specific embodiment of the invention can be described with reference to FIG. 3. FIG. 3 displays a method for allowing efficient allocation of data center resources in a virtualized data center. In step 300, network information is obtained from a network. In step 301, data center information is obtained from a virtual center server. In step 302, a set of key data center performance metrics are determined. This set of key metrics includes a set of application traffic metrics based on the network information obtained in step 300 and a set of virtualized infrastructure metrics based on the data center information obtained in step 301. In step 303, the virtualized infrastructure metrics and application traffic metrics are provided to an external user.

The method described with reference to FIG. 3 and other methods described herein can be embodied by one or more processor readable storage devices having embodied processor readable non-transitory code. An ARB implemented on a computer system is capable of executing all of the steps described with reference to FIG. 3. In specific embodiments of the invention, the ARB is implemented by web server 205 as displayed in FIG. 2. In specific embodiments of the invention, the computer system implementing the ARB will also be implementing virtual center server 202.

Figure 4:
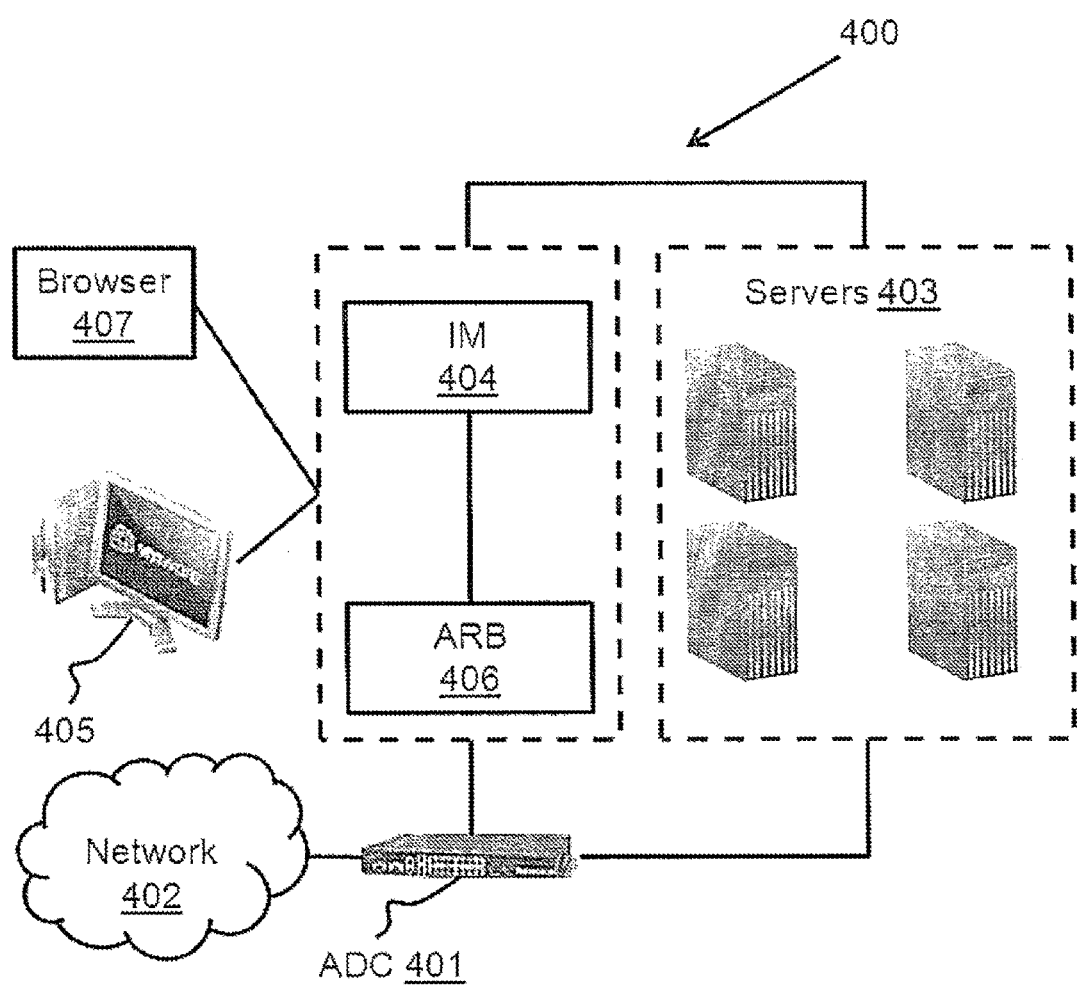
FIG. 4 illustrates a block diagram of a virtualized data center that is in accordance with the present invention.

A specific embodiment of the invention can be described with reference to FIG. 4. FIG. 4 displays a virtualized data center 400 with both hardware and software elements. The web server 205 of FIG. 2 is implemented by ADC 401. ADC 401 takes part in the management of application traffic from network 402 to servers 403. ADC 401 is capable of implementing the data center workload manager function and load balancing the pools of VMs formed by servers 403. Infrastructure management module 404 allows a network administrator to interface with the virtual center server using infrastructure client 405.

In specific embodiments of the invention, an apparatus to assist the administration of virtualized data center 400 comprises a central controller. In specific embodiments of the invention, the central controller will comprise ARB 406. As mentioned previously, ARB 406 could be implemented on ADC 401.

In specific embodiments of the invention, the apparatus to assist the administration of virtualized data center 400 additionally comprises a data center communication port configured to receive data center information and provide this information to the central controller. In specific embodiments of the invention, the data center communication port will be a logical connection from infrastructure management module 404 to ARB 406. In specific embodiments of the invention, infrastructure management module 404 will be a standard infrastructure management software tool such as VMWare's vCenter, and the aforementioned logical connection will comprise a web service application programming interface (API). Using a suitable API, the web server can be extended to work with any vendor providing the virtualized interface. In specific embodiments of the invention, the web server will run on the virtual center server itself. This extensible architecture fits the components on many modern virtual architectures and platforms. For example, the components interface with hypervisors and other infrastructure managers. In specific embodiments of the invention, ARB 406 and the infrastructure management module 404 will both be software modules implemented by ADC 401. In these embodiments, the data center communication port will be one or more physical ports connecting ADC 401 with servers 403.

In specific embodiments of the invention, the apparatus to assist the administration of virtualized data center 400 additionally comprises a network communication port configured to receive network information and provide the network information to the central controller. In specific embodiments of the invention, the network communication port will be a logical connection between the data center's virtual center server and the ARB. In specific embodiments wherein ARB 406 is implemented by ADC 401 the network communication port will be one or more physical ports connecting ADC 401 with network 402. The central controller is configured to prepare a set of application traffic metrics based on the obtained network information and a set of virtualized infrastructure metrics based on the data center information.

In specific embodiments of the invention, ARB 406 can be integrated with standard infrastructure manager software such that the graphical user interface for the ARB shows up as a tab in the graphical user interface for the infrastructure manager software. Standard infrastructure manager software includes VMware's vCenter as well as Microsoft Systems' infrastructure manager, and Dell's infrastructure manager. However, the ARB can also be implemented as a highly portable and extensible independent web application platform. The platform could be implemented in javaware and installed on any server.

In specific embodiments of the invention, the metrics obtained by the central controller will be prepared for external use and presented visually to a data center administrator. The ARB will present the network administrator with a consolidated view of the application landscape and provide visibility into the application performance and data center workload as a function of response time, number of connections and processor utilization. In accordance with these embodiments, step 303 could be accomplished by outputting these metrics to a computer screen. The presentation of these metrics to the administrator can be achieved through the use of a standard infrastructure management tool in which case the administrator can access the data through infrastructure client 405. The presentation of these metrics could also be achieved through the use of a standalone web browser 407. In specific embodiments of the invention the key metrics obtained and presented to the administrator include response times, connections from the ADC, load on real servers and virtual IP addresses (VIPs), memory bandwidth, throughput, and real server processing unit usage percentages. In specific embodiments of the invention, key metrics will be obtained and their values stored over time such that historical data on these key metrics can be displayed to the network administrator.

Figure 5:
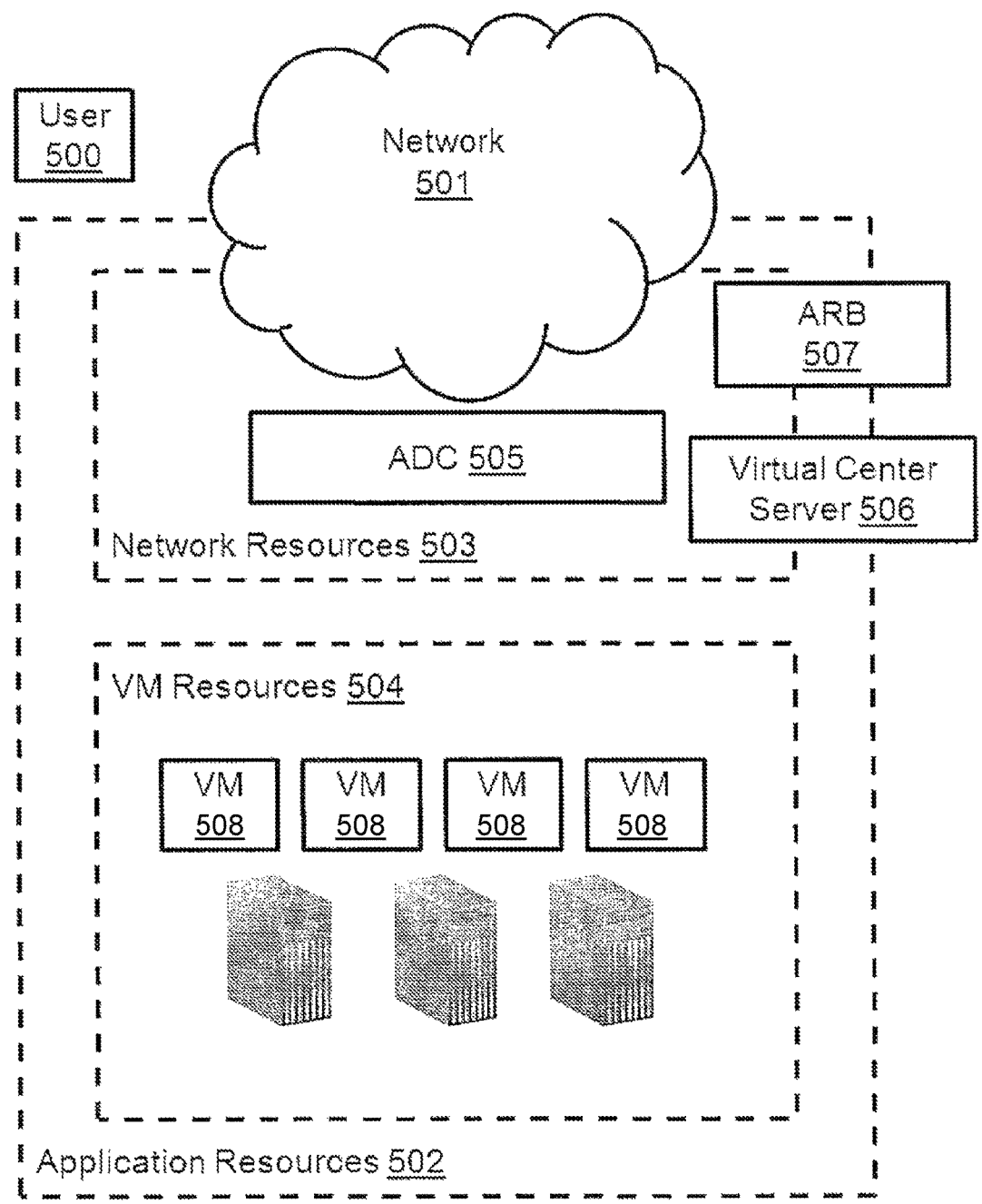
FIG. 5 illustrates a block diagram of the layered resources in a virtualized data center operating in accordance with the present invention.

A specific embodiment of the invention can be described with reference to FIG. 5. FIG. 5 illustrates the layered resources in a virtualized data center. A user 500 connects to network 501 to run an application such as a web browser. The request accesses the application resources 502 available in the data center. The application resources encompass network resources 503 and virtual machine resources 504. The network resources comprise, among other things, ADC 505. The ADC uses its workload management function to access a particular VM out of VMs 508 to serve the request. This process is implemented by the coordination of the software running on ADC 505 communicating with virtual center server 506. Virtual center server 506 is aware of the configuration of all of VM resources 504. ARB 507 runs as part of the application resources on ADC 505 and communicates with virtual center server 506 and the ADC software to get access to both ends of the data center path. ARB 507 gets access to the front-end side, through ADC 505 due to its workload management function. ARB 507 gets access to the back side "inside the server complex" view through communication with virtual center server 506.

In a specific embodiment of the invention, ARB 507 obtains key metrics from the workload management module running on ADC 505, and the infrastructure management module running on virtual center server 506 on an application-by-application basis. This embodiment allows tracking virtual machine resources granted per application and the grouping of virtual machines and physical servers on a per application basis. As such information can be provided on the present status of all servers or virtual machines deployed to serve a particular application. The virtual machines and the servers can be identified in terms of their VIPs, their actual IP address, or other tags through which they are known to other components. The applications could be web browser accesses, storage accesses, or network accesses. Such applications could also be any other layer 7 application. By monitoring, analyzing, gathering and acting on the information and intelligence gathering per application, a greater degree of granularity of control and management is possible. Generally, the variations in demand by network 501 are sensitive to a particular application. By focusing on the servers deployed in the application, any demand perturbations per application can suitably be responded to. Therefore, application-based monitoring and control lends itself to better reactions to demand variations and a commensurately improved utilization.

Figure 6:
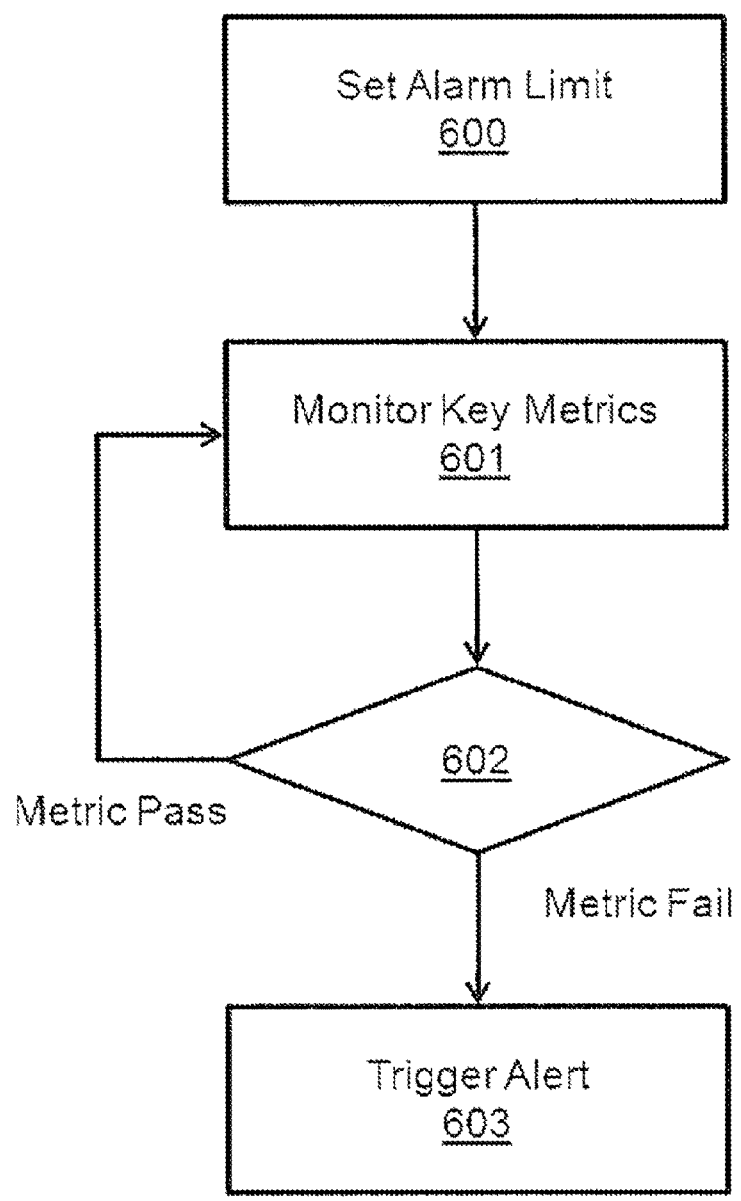
FIG. 6 illustrates a process flow chart of a method for providing a performance alarm to a network administrator.

A specific embodiment of the invention can be described with reference to FIG. 6. FIG. 6 displays a method for providing a performance alarm to a network administrator. In step 600 an alarm threshold is set for a specific metric. For example, an administrator may set a threshold that is crossed when CPU utilization exceeds 90%. The threshold can be set using a standalone web server or an infrastructure management software module plug-in that allows users access to the ARB. In step 601, key metrics are monitored. In specific embodiments, step 601 will be conducted in accordance with the methods described with reference to FIG. 3. In step 602, a selected metric is tested against the threshold. If the metric passes this test the method continues with step 601. However, if the metric fails this test the central controller triggers an alert in step 603. Triggering an alert can include sending out the alert in the form of an email or SNMP alert. In addition, the alarm handlers can be commands, such as those described below with reference to automatic provisioning of data center resources. In addition, some alarms may be set when any product instantiating the ARB is deployed so that user inputs are not necessary for first time use.

A specific embodiment of the invention can be described with reference again to FIG. 4. Application resource broker 406 is capable of monitoring the data center's key metrics as described in FIG. 6. In addition, application resource broker 406 can automatically provision resources from physical servers 403 for network 402 based on those key metrics. For example, instead of or in combination with the issuance of an alarm that a key metric has passed a threshold application resource broker 406 could send an easy link to the administrator enabling the administrator to commission or decommission additional virtual machines to maintain a desired level of end user experience on network 402. In addition, application resource broker 406 could be configured to automatically send a commission-virtual-machine command message to a workload management software module when one of the key metrics passes a critical threshold indicating additional resources were needed. Likewise, application resource broker 406 could be configured to automatically send a decommission-virtual-machine command message to a workload management software module when a key metric passed a critical threshold indicating additional resources are no longer needed. For example, if application resource broker 406 determined that response times where exceeding 2 ms, then application resource broker 406 could send a signal to commission another virtual machine in servers 403 to bring the response time to within a desired level.

Figure 7:
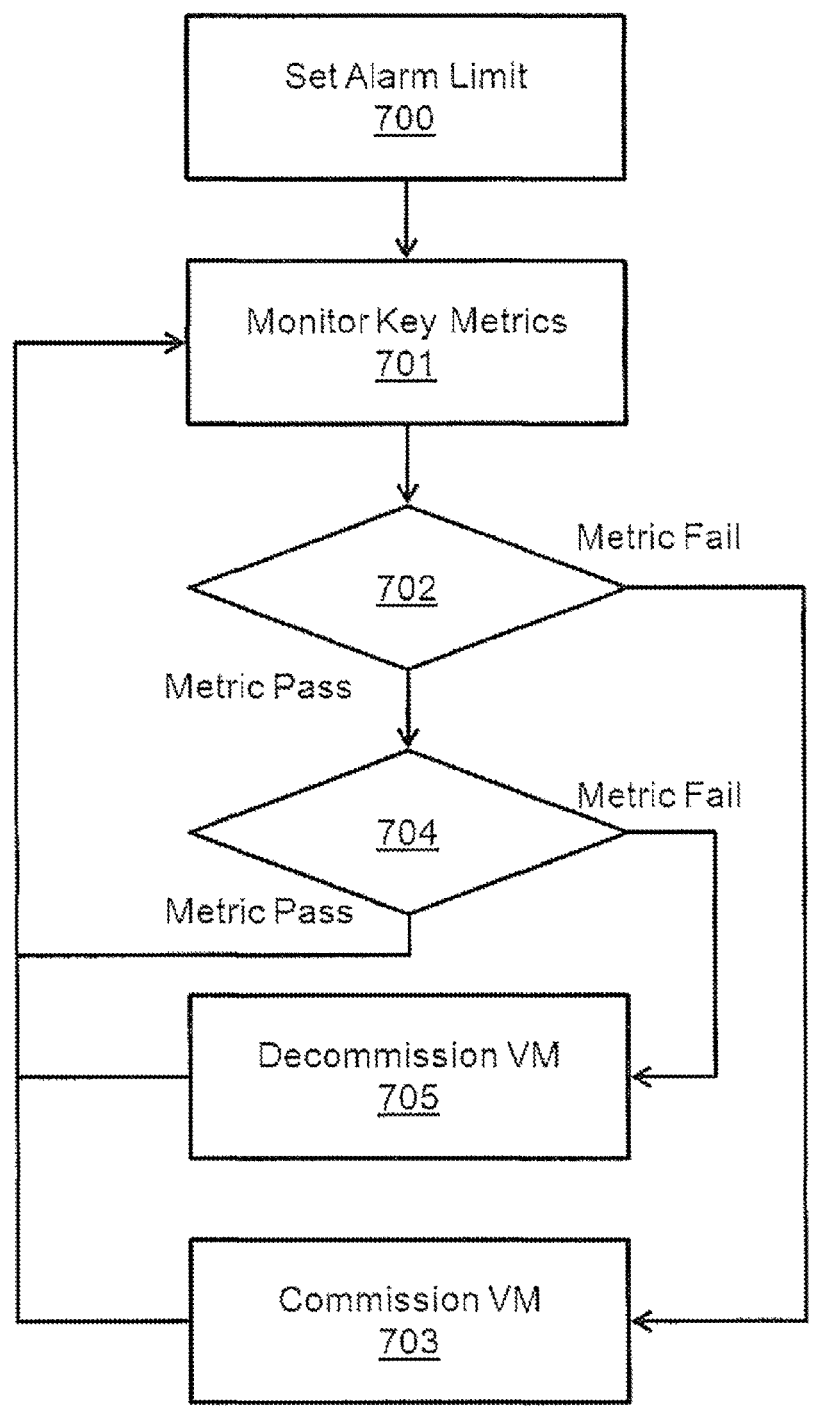
FIG. 7 illustrates a process flow chart of a method for automatically provisioning resources to a network in a data center.

A specific embodiment of the invention can be described with reference to FIG. 7. FIG. 7 displays a method for automatically provisioning resources to a network in a data center. Steps 700 and 701 are conducted in substantially the same way as steps 600 and 601 respectively. In step 702 the metric being monitored for sufficient resources is checked. If the metric fails, an additional VM is commissioned in the virtualized data center in step 703, and then the central controller continues to monitor key metrics in step 701. In step 704, the metric being monitored for over-provisioning of resources is checked. The metric checked in step 702 and step 704 may be the same. If the metric fails a VM is decommissioned in the virtualized data center in step 705, and the central controller continues to monitor key metrics in step 701.

Figure 8:
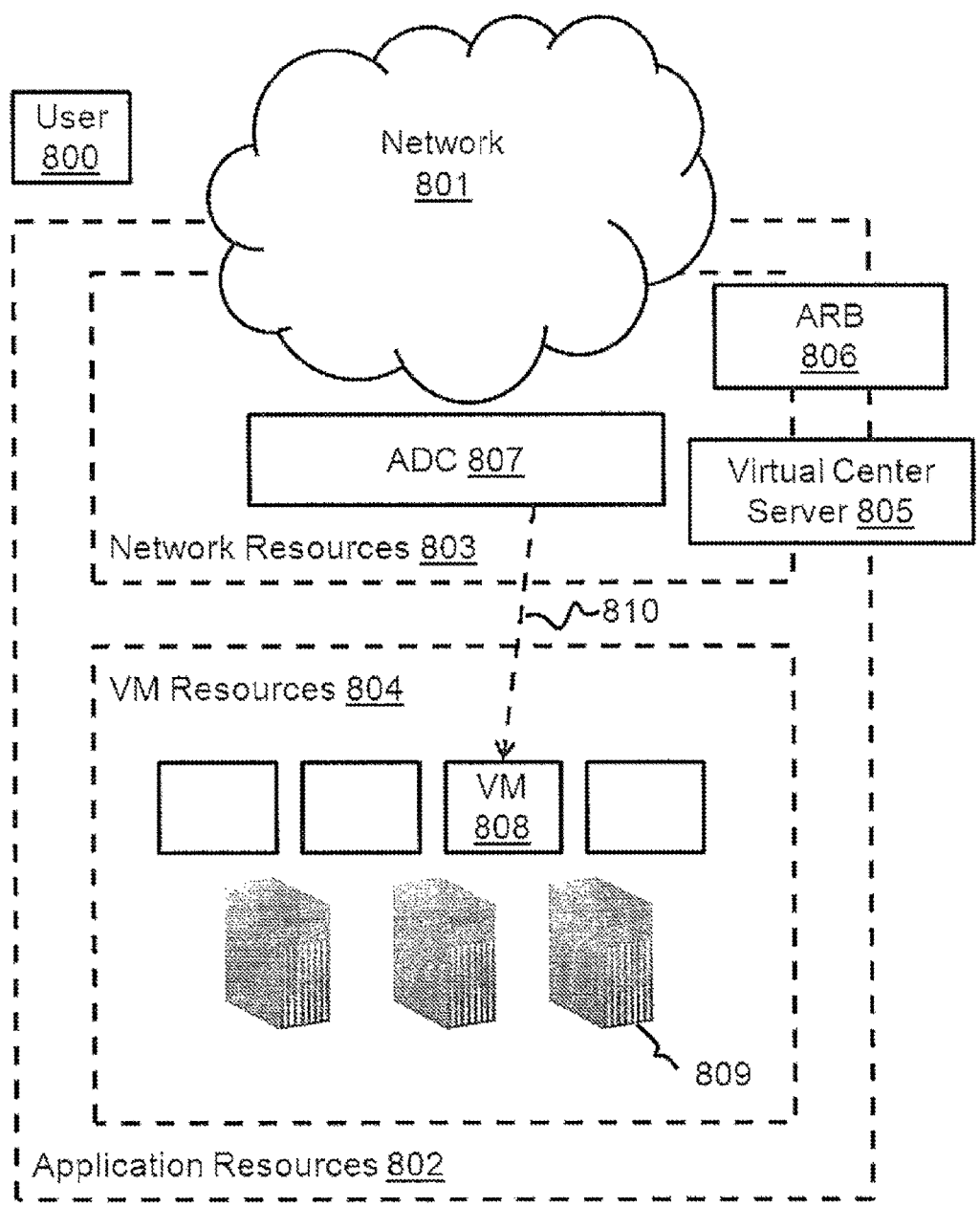
FIG. 8 illustrates a block diagram of the layered resources in a virtualized data center automatically provision resources in accordance with the present invention.

A specific embodiment of the invention can be described with reference to FIG. 8. FIG. 8 illustrates the layered resources in a virtualized data center and how this data center can automatically provision resources. A user 800 connects to network 801 to run an application such as a web browser. The request accesses the application resources 802 available in the data center. The application resources encompass network resources 803 and VM resources 804. In specific embodiments of the invention virtual center server 805 and ARB 806 will both run as application resources in ADC 807. ARB 806 continuously monitors the usage of VM resources 804 based on the performance of a set of key metrics. Where the metrics provide for guidance of set performance or benchmarks, any deviation from the benchmarks constitutes an event. Such an event may generate a log, or trigger an event to commission a new VM for a particular application. In one embodiment, this commissioning requires manual intervention from a network administrator. In another embodiment, this commissioning is done automatically. When a server such as server 809 is powered on to commission a VM such as VM 808, the server will be configured and identified in the virtual center server through an appropriate tag. The tag could be a VIP address of a real IP address. Once identified by ADC 807 and the back end virtual center server 805, newly commissioned VM 808 will become a participant in the pool of VMs. The addition of VM 808 is shown by dotted arrow 810 in FIG. 8.

A specific embodiment of the invention can be described with reference again to FIG. 8. FIG. 8 illustrates the layered resources in a virtualized data center and how this data center can automatically provision resources. When a key metric monitored by application resource broker 806 indicates that the usage of a resource such as VM 808 is not necessary to provide network 801 with adequate resources, that resource will be decommissioned. As with commissioning resources this process can be accomplished by the issuance of a prompt to and receipt of a manual response from a network administrator, or it can be accomplished in a fully automated fashion. The decommissioning of a VM may also optionally involve deregistration from ADC 807. The deregistration may be achieved by removing the appropriate tag from the appropriate data structures in ADC 807 as well as virtual center server 805. After decommissioning, the VM may be powered down, without affecting the rest of the data center. This decommissioning, coupled with appropriate commissioning when necessary, supports real time response to the demand fluctuations of network 801. The VMs are commissioned or decommissioned on an as-needed basis, saving power and while at the same time providing the appropriate resources to assure all SLAs are met. In specific embodiments, the application resource broker is also capable of changing the load balancer configuration to indicate the change in demand.

Figure 9:
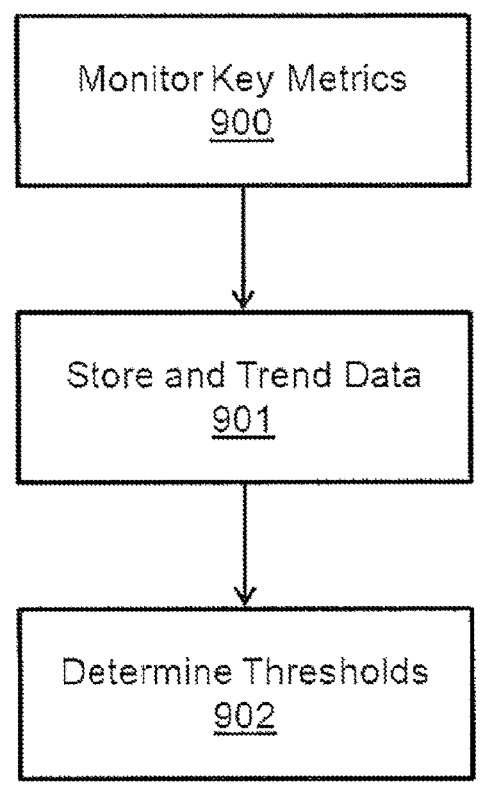
FIG. 9 illustrates a process flow chart of a method for automatically provisioning data center resources that is in accordance with the present invention.

A specific embodiment of the invention can be described with reference to FIG. 9. FIG. 9 displays a method for automatically provisioning data center resources based on trends found in data obtained by monitoring key metrics. In step 900, key metrics are monitored. In specific embodiments, step 900 will be conducted in accordance with the methods described with reference to FIG. 3. In step 901, data obtained by monitoring key metrics is stored and trended to look for patterns in the demand placed on the data center and the data centers response to that demand. Fuzzy logic can be employed to find these patterns. In step 902, the trended performance data produced in step 901 is used to formulate thresholds for use in automated provisioning methods described with reference to FIG. 7. As such, additional VMs may be commissioned and excess resources may be decommissioned based on the trended performance data. For example, it might be determined that a rapid rise of CPU utilization percentage from 50% to 80% is well correlated with an additional rise from 80% to 95%. Therefore, the detection of a rise from 50% to 80% can automatically trigger an appropriate response to the impending 95% CPU utilizing load so that provisioning is a step ahead of actual demand.

Figure 10:
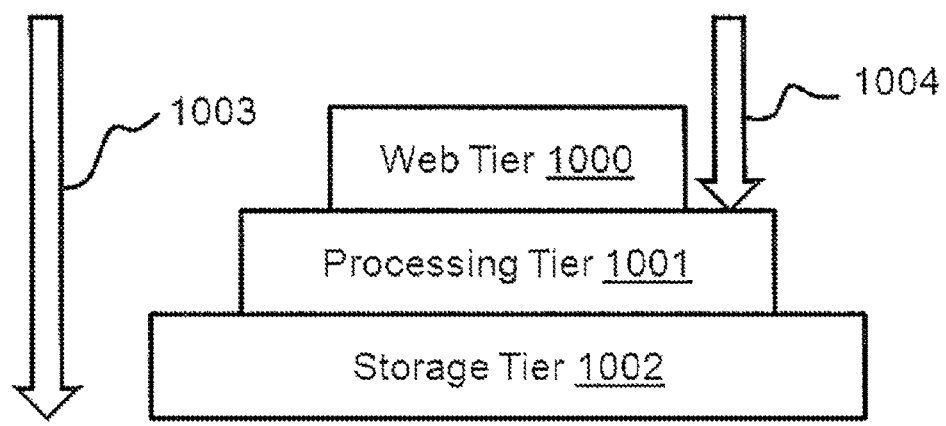
FIG. 10 illustrates a block diagram of the several tiers of a data center architecture.

A specific embodiment of the invention can be described with reference to FIG. 10. FIG. 10 displays the several tiers of a data center architecture. The tiers include a front-end web tier 1000, a middle-ware processing tier 1001, and a storage tier 1002. The visibility afforded to the central controller as described above is plotted by arrow 1003. The visibility accorded to the central controller for metric setting and measurements is holistic and network wide and therefore encompasses all three tiers. In specific embodiments of the invention where the central controller includes an ARB module, visibility to these deep tiers is provided by the logical connections between the ARB module and the virtual center server. Arrow 1004 is drawn to show the extent of many prior art systems for data center resource monitoring and allocation. These prior art systems do not have visibility into the proprietary implementations of these tiers. Specific embodiments of the present invention overcome this limiting feature of prior art systems.

Although embodiments of the invention have been discussed primarily with respect to specific embodiments thereof, other variations are possible. Various configurations of the described system may be used in place of, or in addition to, the configurations presented herein. For example, although the data center resources where often referred to as VMs the present invention applies to other resources including but not limited to network resource or storage resources.

Those skilled in the art will appreciate that the foregoing description is by way of example only, and is not intended to limit the invention. Nothing in the disclosure should indicate that the invention is limited to systems that function with only a single data center; the visibility into the multiple tiers of the data center may be extended to multiple data centers. The web server may be connected to the Internet and have logical connections to the virtual center server and the VMs within the data center. There is nothing in the architecture that limits the web server from being able to connect to multiple data centers either local or remote. Sharing of resources across multiple data centers may involve remotely adding or removing VMs based on the particular application at hand. Nothing in the disclosure should limit the scope of the invention to electronics or communication through the use of charged particles or electro-magnetic waves. Functions may be performed by hardware or software, as desired. In particular the term "virtual center server" should not be limited to a hardware implementation as it is used in the specification and in the appending claims in a manner that encompasses a software module. In general, any diagrams presented are only intended to indicate one possible configuration, and many variations are possible. As used in the specification and in the appended claims, the term "set" can be used to refer to a set comprising a single member. Those skilled in the art will also appreciate that methods and systems consistent with the present invention are suitable for use in a wide range of applications encompassing any related to data centers or information technology in general.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A controller system, comprising:
    a first physical port configured to connect the controller system to a data center;
    a second physical port configured to connect the controller system to a network;
    one or more processors;
    a memory coupled with and readable by the one or more processors, wherein the memory includes instructions that, when executed by the one or more processors, cause at least one processor from the one or more processors to perform operations including:
       receiving a request using the second physical port;
       obtaining data center information from the data center, wherein the data center information is received using the first physical port, wherein the data center information is obtained by an application resource broker executed by the controller system;
       determining performance metrics for the data center using the data center information, wherein the performance metrics include a current workload of the data center, and wherein the performance metrics are determined by the application resource broker;
       provisioning a set of resources from resources of the data center, wherein the set of resources are provisioned to serve the request, wherein the set of resources are provisioned by the application resource broker, and wherein the resources of the data center include a plurality of virtual machine resources and a plurality of physical servers; and
       tracking the virtual machine resources granted per application and grouping of virtual machines among the plurality of virtual machine resources and physical servers among the plurality of physical servers on a per application basis.

2. The controller system of claim 1, wherein the request is received in response to initiation of an application for execution in the data center.

3. The controller system of claim 1, wherein the set of resources are provisioned from the plurality of virtual machine resources.

4. The controller system of claim 1, wherein the performance metrics include a current status of infrastructure in the data center.

5. The controller system of claim 1, wherein the memory further includes instructions that, when executed by the one or more processors, cause at least one processor from the one or more processors to perform operations including:
    performing a provisioning action for an application associated with the request.

6. The controller system of claim 1, wherein the memory further includes instructions that, when executed by the one or more processors, cause at least one processor from the one or more processors to perform operations including:
    executing an infrastructure management tool, wherein the infrastructure management tool provides an interface to one or more virtual machines executing in the data center.

7. The controller system of claim 1, wherein the plurality of servers are executing a plurality of virtual machines for supporting a plurality of applications running in the data center.

8. A computer-implemented method, comprising:
    receiving, by a controller system, a request using a second physical port of the controller system, wherein the second physical port is configured to connect the controller system to a network;
    obtaining data center information from a data center, wherein the data center information is received using a first physical port of the controller system, wherein the first physical port is configured to connect the controller system to the data center; and wherein the data center information is obtained by an application resource broker executed by the controller system;
    determining performance metrics for the data center using the data center information, wherein the performance metrics include a current workload of the data center, and wherein the performance metrics are determined by the application resource broker;
    provisioning a set of resources from resources of the data center, wherein the set of resources are provisioned to serve the request, wherein the set of resources are provisioned by the application resource broker, and wherein the resources of the data center include a plurality of virtual machine resources and a plurality of physical servers; and
    tracking the virtual machine resources granted per application and grouping of virtual machines among the plurality of virtual machine resources and physical servers among the plurality of physical servers on a per application basis.

9. The computer-implemented method of claim 8, wherein the request is received in response to initiation of an application for execution in the data center.

10. The computer-implemented method of claim 8, wherein the set of resources are provisioned from the plurality of virtual machine resources.

11. The computer-implemented method of claim 8, wherein the performance metrics include a current status of infrastructure in the data center.

12. The computer-implemented method of claim 8, further comprising:
performing a provisioning action for an application associated with the request.

13. The computer-implemented method of claim 8, further comprising:
executing an infrastructure management tool, wherein the infrastructure management tool provides an interface to one or more virtual machines executing in the data center.

14. The computer-implemented method of claim 8, wherein the plurality of servers are executing a plurality of virtual machines for supporting a plurality of applications running in the data center.

15. A non-transitory processor-readable storage device storing program code, the program code including instructions that, when executed by one or more processors, cause at least one processor from the one or more processors to:
receive, by a controller system, a request using a second physical port of the controller system, wherein the second physical port is configured to connect the controller system to a network;
obtain data center information from a data center, wherein the data center information is received using a first physical port of the controller system, wherein the first physical port is configured to connect the controller system to the data center; and wherein the data center information is obtained by an application resource broker executed by the controller system;
determine performance metrics for the data center using the data center information, wherein the performance metrics include a current workload of the data center, and wherein the performance metrics are determined by the application resource broker;
provision a set of resources from resources of the data center, wherein the set of resources are provisioned to serve the request, wherein the set of resources are provisioned by the application resource broker, and wherein the resources of the data center include a plurality of virtual machine resources and a plurality of physical servers; and
track the virtual machine resources granted per application and grouping of virtual machines among the plurality of virtual machine resources and physical servers among the plurality of physical servers on a per application basis.

16. The non-transitory processor-readable storage device of claim 15, wherein the request is received in response to initiation of an application for execution in the data center.

17. The non-transitory processor-readable storage device of claim 15, wherein the set of resources are provisioned from the plurality of virtual machine resources.

18. The non-transitory processor-readable storage device of claim 15, wherein the performance metrics include a current status of infrastructure in the data center.

19. The non-transitory processor-readable storage device of claim 15, further including instructions that, when executed by the one or more processors, cause at least one processor from the one or more processors:
perform a provisioning action for an application associated with the request.

20. The non-transitory processor-readable storage device of claim 15, further including instructions that, when executed by the one or more processors, cause at least one processor from the one or more processors to:
execute an infrastructure management tool, wherein the infrastructure management tool provides an interface to one or more virtual machines executing in the data center.

* * * * *